US012213931B1

(12) United States Patent
Wu

(10) Patent No.: US 12,213,931 B1
(45) Date of Patent: Feb. 4, 2025

(54) SEXUAL STIMULATION DEVICE

(71) Applicants: Dongguan Yueya Technology Co., Ltd., Guangdong (CN); Dongguan Hongxiang Electronic Technology Co., Ltd., Guangdong (CN); Shenzhen Zhonghongtian Technology Co., Ltd., Shenzhen (CN)

(72) Inventor: Dongjun Wu, Guangdong (CN)

(73) Assignees: Kongguan Yueya Technology Co., Ltd., Dongguan (CN); Dongguan Hongxiang Electronic Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/642,854

(22) Filed: Apr. 23, 2024

(30) Foreign Application Priority Data

Jan. 26, 2024 (CN) ........................ 202420202016.X
Apr. 3, 2024 (CN) ........................ 202420687877.1

(51) Int. Cl.
*A61H 19/00* (2006.01)
*A61H 23/00* (2006.01)
*A61H 23/02* (2006.01)

(52) U.S. Cl.
CPC ............ *A61H 19/44* (2013.01); *A61H 19/34* (2013.01); *A61H 23/0254* (2013.01); *A61H 2201/0153* (2013.01); *A61H 2201/5025* (2013.01)

(58) Field of Classification Search
CPC .... A61H 7/005; A61H 23/0254; A61H 21/00; A61H 19/00; A61H 19/30; A61H 19/34; A61H 19/40; A61H 19/44; A61H 19/50
See application file for complete search history.

(56) References Cited

U.S. PATENT DOCUMENTS

| | | | | |
|---|---|---|---|---|
| 3,874,373 A * | 4/1975 | Sobel | A61H 19/34 | 601/112 |
| 5,470,303 A * | 11/1995 | Leonard | A61H 19/34 | 600/38 |
| 6,190,307 B1 * | 2/2001 | Tsai | A61H 19/34 | 601/51 |
| 11,369,545 B1 * | 6/2022 | He | A61H 7/001 | |

(Continued)

FOREIGN PATENT DOCUMENTS

| | | | |
|---|---|---|---|
| CN | 206508214 U * | 9/2017 | |
| GB | 2492535 A * | 1/2013 | |
| JP | 2004313689 A * | 11/2004 | A61H 19/34 |

OTHER PUBLICATIONS

English translation of JP 2004313689, machined translated on Jun. 26, 2024, machined translated by Espacenet.com.*

*Primary Examiner* — Tu A Vo

(57) ABSTRACT

A sexual stimulation device includes a shell and a driving mechanism being provided in the shell. The shell is configured to be inserted into the human body, and includes a massage portion made of flexible material. The driving mechanism includes a gearbox and a driving rod. The driving rod includes a first end and a second end opposite to the first end. The first end is connected to the gearbox in a transmission way, and the second end is inserted into the massage portion of the shell. The first end is inclined relative to the second end, and the massage portion is rotatable along with the second end around the first end under the driving of the gearbox.

12 Claims, 11 Drawing Sheets

(56) References Cited

U.S. PATENT DOCUMENTS

| | | | | |
|---|---|---|---|---|
| 11,771,619 | B1 * | 10/2023 | Yan | A61H 19/44 600/38 |
| 11,826,300 | B1 * | 11/2023 | Zhou | A61H 19/34 |
| 2008/0139980 | A1 * | 6/2008 | Fladl | A61H 19/32 601/70 |
| 2009/0198158 | A1 * | 8/2009 | Nan | A61H 23/0254 601/87 |
| 2010/0121234 | A1 * | 5/2010 | Nan | A61H 19/44 601/134 |
| 2015/0148592 | A1 * | 5/2015 | Kanbar | A61H 19/34 600/38 |
| 2016/0120737 | A1 * | 5/2016 | Sedic | A61H 19/44 601/46 |
| 2018/0185237 | A1 * | 7/2018 | Baetica | G08C 17/02 |
| 2023/0346634 | A1 * | 11/2023 | Wu | A61H 23/004 |
| 2024/0277562 | A1 * | 8/2024 | Wang | A61H 23/02 |

* cited by examiner

SEXUAL STIMULATION DEVICE

CROSS-REFERENCE TO RELATED APPLICATIONS

The present application claims priorities to Chinese Patent Application No. 202420202016.X, filed on Jan. 26, 2024, and Chinese Patent Application No. 202420687877.1, filed on Apr. 3, 2024, the entire contents of which are hereby incorporated by reference.

TECHNICAL FIELD

The present application relates to the technical field of sex toys, and in particular to a sexual stimulation device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like that contacts with the massage head. However, such sex toy stimulates the human body by a hitting of the massage head with a high-frequency, with limited stimulation range and unsatisfactory stimulation effect.

SUMMARY

An object of this application is to provide a sexual stimulation device, which has an enlarged stimulation range and better stimulation effect.

To achieve the above object, a sexual stimulation device is provided and includes:

- a shell configured to be inserted into the human body, the shell including a massage portion which is made of flexible material; and
- a driving mechanism being provided in the shell, the driving mechanism including a gearbox and a driving rod, the driving rod including a first end and a second end opposite to the first end, the first end being connected to the gearbox in a transmission way, and the second end being inserted into the massage portion of the shell;
- the second end being inclined relative to the first end, and the massage portion being rotatable along with the second end around the first end under the driving of the gearbox.

Compared with the prior art, the present application has the following beneficial effects: the massage portion rotates to form an annular trajectory, and thus kneads the sensitive area of the human body. An area of the human body kneaded by the massage portion is enlarged and accordingly a stimulation effect is better. Moreover, the massage portion kneads the human body, which is similar to the motion of the human hand, providing a more comfortable user experience.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
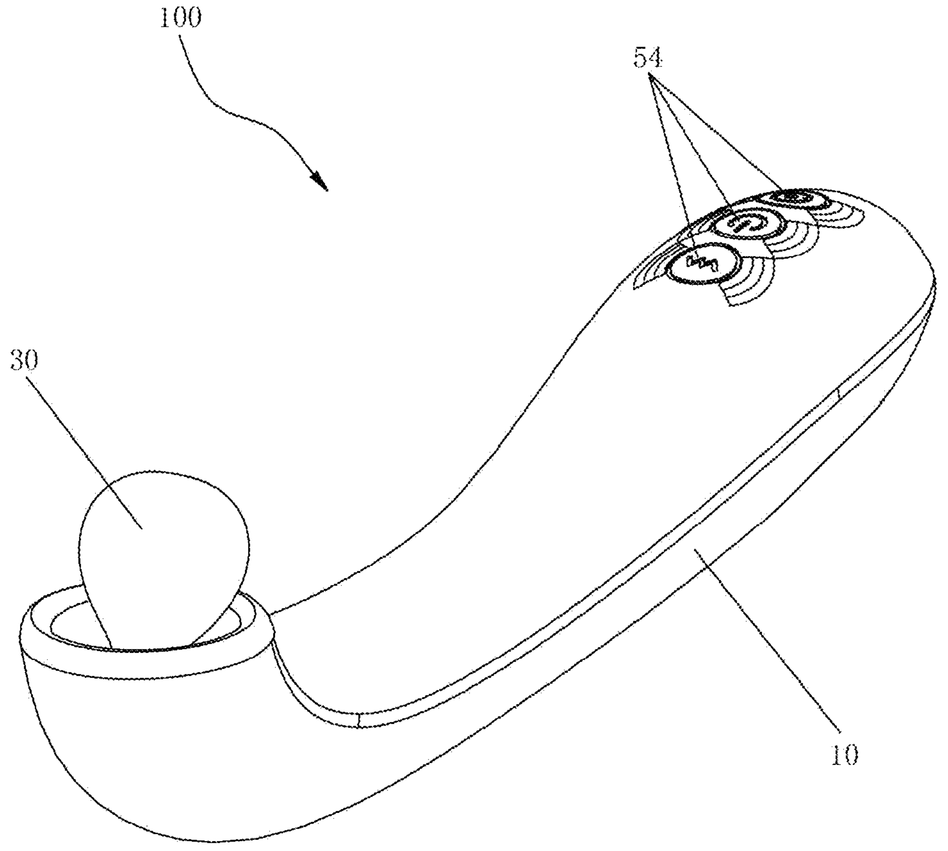
FIG. 1 is a schematic, assembled view of a sexual stimulation device according to an embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-5, a sexual stimulation device 100 according to an embodiment of the present application is shown. The sexual stimulation device 100 includes a shell 10 and a driving mechanism 20 arranged in the shell 10. The shell 10 is provided with a massage portion 30, and the driving mechanism 20 is connected to the massage portion 30 in a transmission way. Under the action of the driving mechanism 20, the massage portion 30 rotates around a first axis X1 to form an annular trajectory. A sensitive area of the human body, such as the clitoris, the vagina of the woman, the rectum, the prostate of the man, as long as it is covered by the annular trajectory of the massage portion 30, can be stimulated by the massage portion 30.

The massage portion 30, serving as a functional part of the present sexual stimulation device that directly acts on the human body, is flexible and may be made of silicone, rubber, and etc. The massage department 30 has a soft touch and can provide a certain buffering effect, thereby improving the comfort of use. It should be noted that the massage portion 30 may be made of other soft materials that can directly contact the human body, which is not limited by the present application. Compared to the existing sexual stimulation devices which stimulate the human body by hitting in high-frequency, the massage portion 30 of the present sexual stimulation device rotates to form an annular trajectory, and thus kneads the sensitive area of the human body. An area of the human body kneaded by the massage portion 30 is enlarged and accordingly a stimulation effect is better. Moreover, the massage portion 30 kneads the human body, which is similar to the motion of the human hand, providing a more comfortable user experience.

Figure 5:
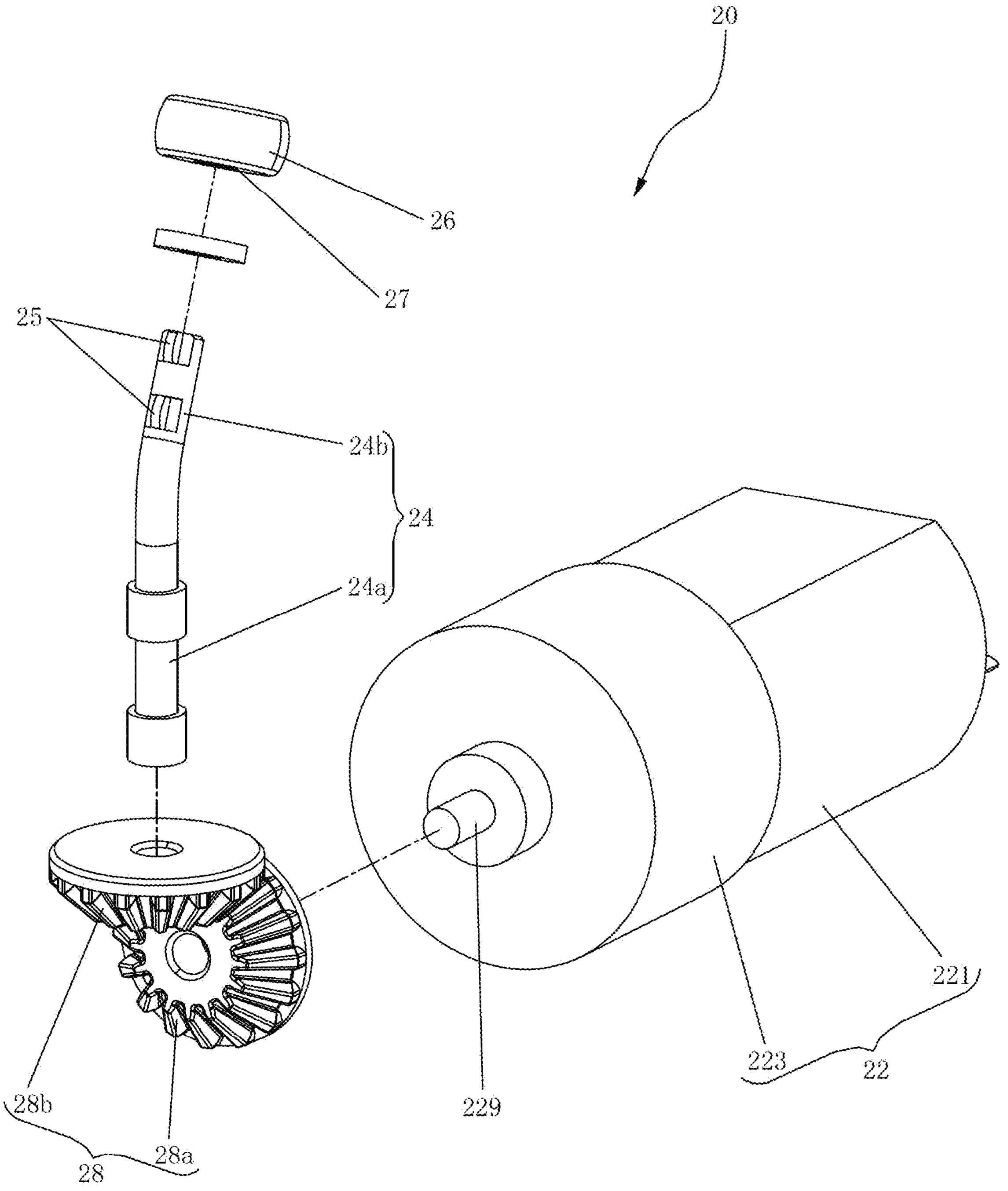
FIG. 5 is a further exploded view of a driving mechanism of the sexual stimulation device.
Figure 6:
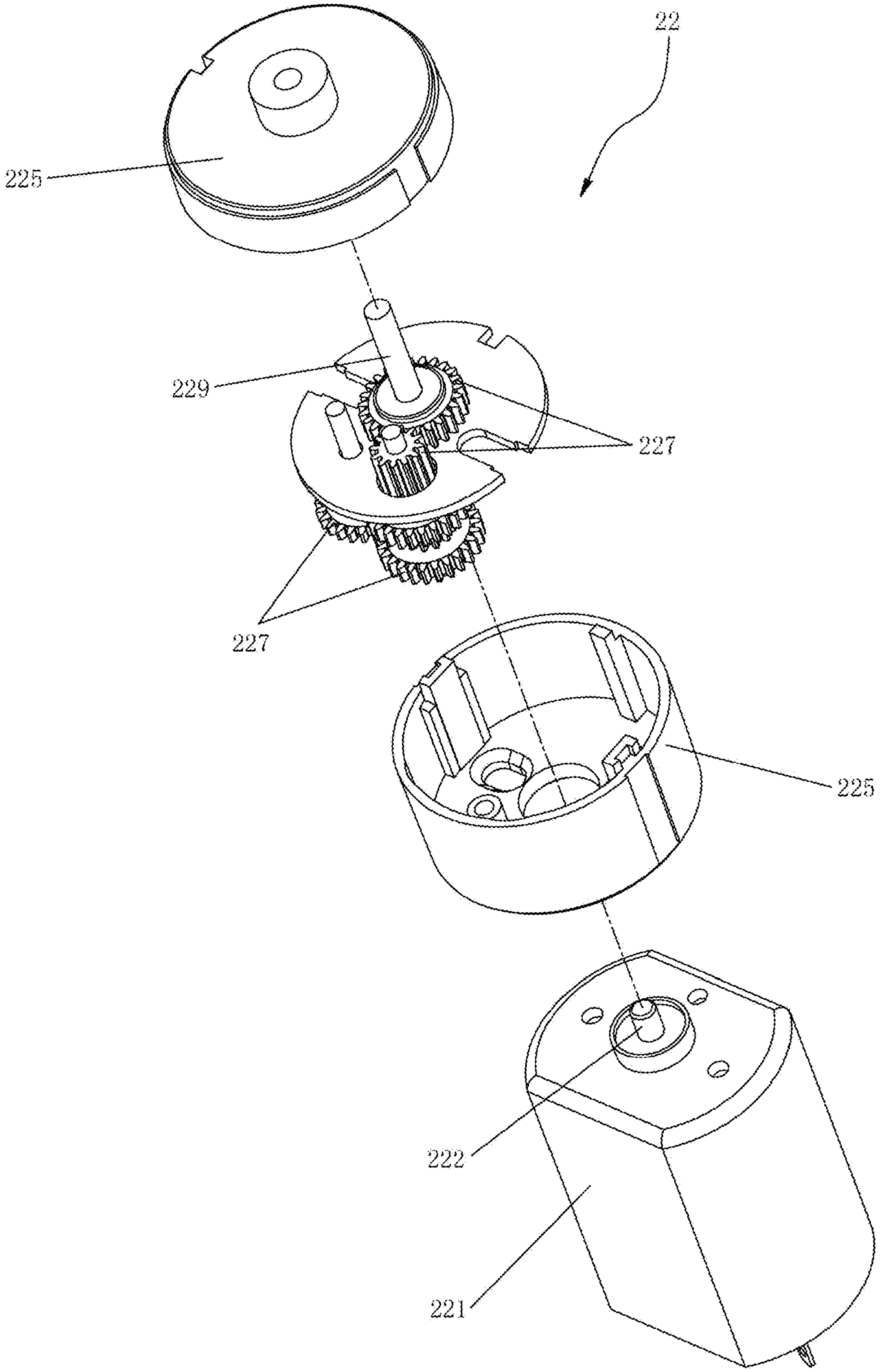
FIG. 6 is a further exploded view of a gearbox of the driving mechanism.

Referring to FIGS. 5-6, the driving mechanism 20 includes a gearbox 22 and a driving rod 24. The driving rod 24 includes a first end 24*a* and a second end 24*b* which are opposite to each other. The second end 24*b* is inclined relative to the first end 24*a*, with a first angle β defined therebetween. Preferably, the first angle β is an obtuse angle. After assembly, the first end 24*a* of the driving rod 24 is connected to an output shaft 229 of the gearbox 22, and the second end 24*b* of the driving rod 24 is fixedly inserted into the massage portion 30. In this way, the gearbox 22 is able to drive the driving rod 24 to rotate, which in turn drives the massage portion 30 to rotate around the first axis X1. In this embodiment, the first axis X1 may be a central axis of the first end 24*a*.

In this embodiment, the massage portion 30 is generally spherical-shaped or ellipsoidal-shaped, and is generally coaxial with the second end 24*b* of the driving rod 24. A second angle α is defined between a central axis X2 of the massage portion 30 and the first axis X1. Preferably, the second angle α is an acute angle, and more preferably, the second angle α is less than 45°. The first angle β between the first end 24*a* and the second end 24*b* is complementary with the second angle α between the first axis X1 and the central axis X2. That is, a sum of the first angle α and the second angle β is 180°, i.e., $\alpha+\beta=180°$. In this way, the second angle α between the central axis X2 of the massage portion 30 and the first axis X1 can be determined according to the first angle β between the first end 24*a* and the second end 24*b* of the driving rod 24, thereby determining a rotation radius of the massage portion 30.

As shown in FIG. 6, the gearbox 22 includes a motor 221 and a gear unit 223. The motor 221 may be a DC motor, and has an output shaft 222 rotating at high-speed. The gear unit 223 includes a gear housing 225 and a plurality of gears 227 mounted inside the gear housing 225. The gears 227 mesh with each other, and a reduction ratio of the whole gear unit 223 can be determined according to the gear ratios between the meshed gears 227. In a specific embodiment, the reduction ratio of the gear unit 223 is not less than 4:1 and not more than 100:1, and an output speed of the gearbox 22 is not exceed 1000 rpm. That is, a speed of the output shaft 229 of the gearbox 22 does not exceed 1000 rpm, and accordingly, a speed of the driving rod 24 and/or the massage portion 30 does not exceed 1000 rpm.

In a specific embodiment, a vibration component 40, such as a vibration motor, is provided inside the massage portion 30. The vibrating component 40 may be integrally fixed inside the massage portion 30 during the process of forming the massage portion 30. During rotating of the massage portion 30, it can vibrate at a predetermined frequency along with the vibration component 40, which not only stimulates the sensitive area of the human body through kneading, but also generates deep stimulation through vibration. A combination of the two different types of stimulation makes the stimulated area of the human body, such as the sexual organs, such as the clitoris or the prostate, more excited, so that the users are more likely to reach orgasm with the help of the present sexual stimulation device 100, resulting in better sexual life and better sexual experience.

Figure 2:
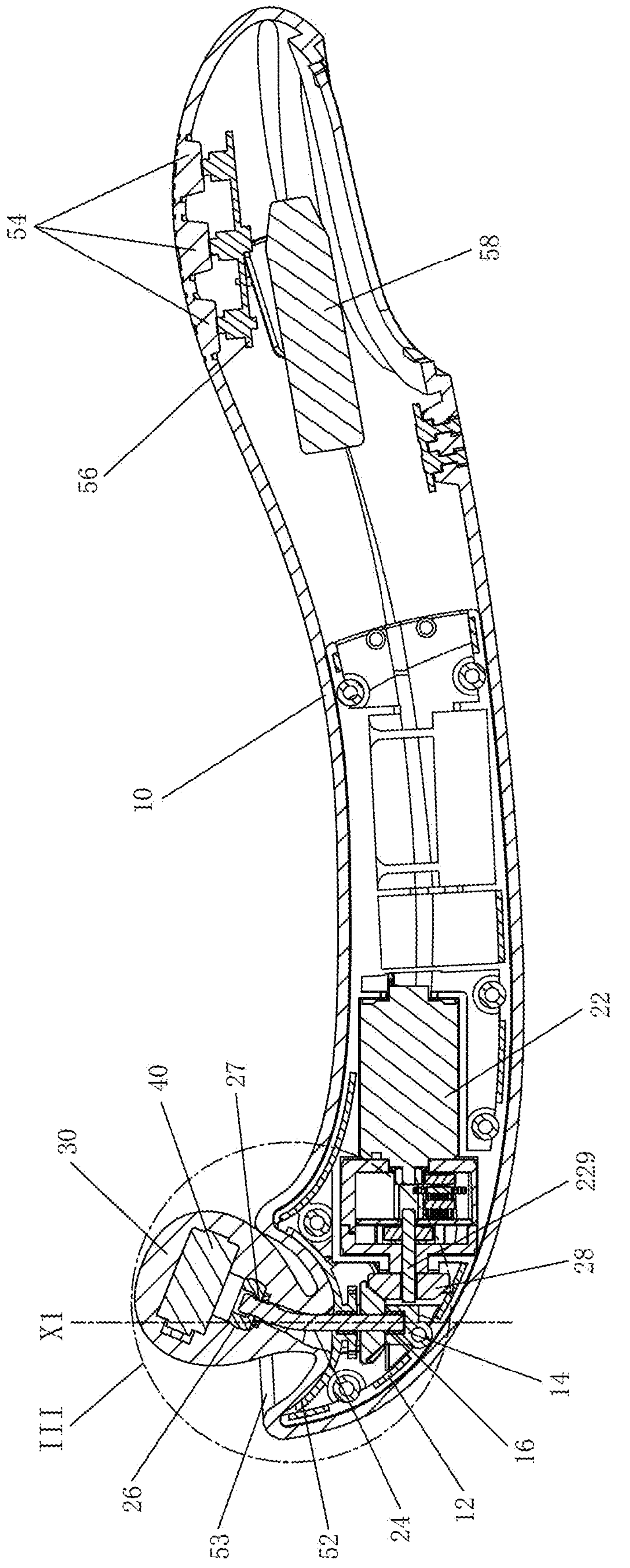
FIG. 2 is a cross sectional view of the sexual stimulation device of FIG. 1.

As shown in FIGS. 1-2, the shell 10 is elongated and generally rod-shaped, being similar to the male penis. During use, the shell 10, particularly the massage portion 30 of the shell 10, is inserted into the sexual organs of the human body, such as the vagina, the rectum and the like. It should be understood that the sexual stimulation device 100 of this application is not limited to be used in the human body. In some embodiments, the sexual stimulation device 100 may be used to stimulate the chest of the human body. According to specific application scenarios, the shell 10 may be configured with different shapes, making the massage portion 30 thereof be easily to contact the sexual organs of the user.

In this embodiment, a front end of the shell 10 is bent laterally, and an end face thereof is concaved inwardly to form a bowl-shaped portion 52 which is arranged around the first axis X1, wherein the first axis X1 is generally perpendicular to a longitudinal direction of the shell 10. The massage portion 30 is set in the bowl-shaped portion 52, with one end thereof serving as a connecting end for connecting a central, bottom of the bowl-shaped portion 52, and another end thereof serving as a free end. The massage portion 30 extends partly beyond the bowl-shaped portion 52 through an open side 53 of the bowl-shaped portion 52. When the massage portion 30 is driven to rotate, it swings in the bowl-shaped portion 52 with its connecting end as the center.

The bowl-shaped portion 52 may be a double-layer structure, and includes an outer layer 52*a* and an inner layer 52*b* inside the outer layer 52*a*. The outer layer 52*a* is made of soft material, and the massage portion 30 extends integrally and outwardly from the central, bottom of the outer layer 52*a*. The inner layer 52*b* is made of hard materials such as plastic, metal, etc., and provides support for the outer layer 52*a* and the massage portion 30.

In a specific embodiment, the shell 10 may be a double-layer structure, and includes a soft outer shell and a hard inner shell, wherein the inner shell provides support for components mounted inside the shell 10, such as the driving mechanism 20; and the outer shell is integrally formed on and encloses the inner shell. The inner layer 52*b* of the bowl-shaped portion 52 may be a part of the inner shell, and the outer layer 52*a* of the bowl-shaped portion 52 may be a part of the outer shell.

When the inner shell of the shell 10 is assembled with the components to be mounted in the shell 10, such as the driving mechanism 20, the outer shell and the massage portion 30 are integrally formed around the inner shell by over-molding, which not only simplifies production and assembly, but also improves the connection strength between the massage portion 30 and the outer shell. During rotation of the massage portion 30 around the first axis X1, it can generate greater deformation without damage, further increasing the stimulation force and stimulation range of the massage portion 30 on the human body. In addition, the outer shell encloses the inner shell, which can achieves good sealing effect for the components inside the shell 10, thereby play a waterproof and dustproof role, and facilitating the cleaning and storage of the sexual stimulation device 100.

For the sexual stimulation device 100 of the present application, it should be understood that the outer shell and the massage portion 30 may be formed separately and then assembled together, so that the massage portion 30 can be selectively disassembled and replaced. In practical applications, the sexual stimulation device 100 can be formed with several massage portions 30 in different shapes and/or sizes. According to specific usage scenarios, the user can choose a corresponding massage portion 30 to ensure the stimulation effect. In this situation, the outer shell is no longer limited to be formed by the same material as that of the massage portion 30. Soft materials such as silicone and rubber, as well as hard materials such as plastic and alloy, may be used to form the outer shell.

Figure 3:
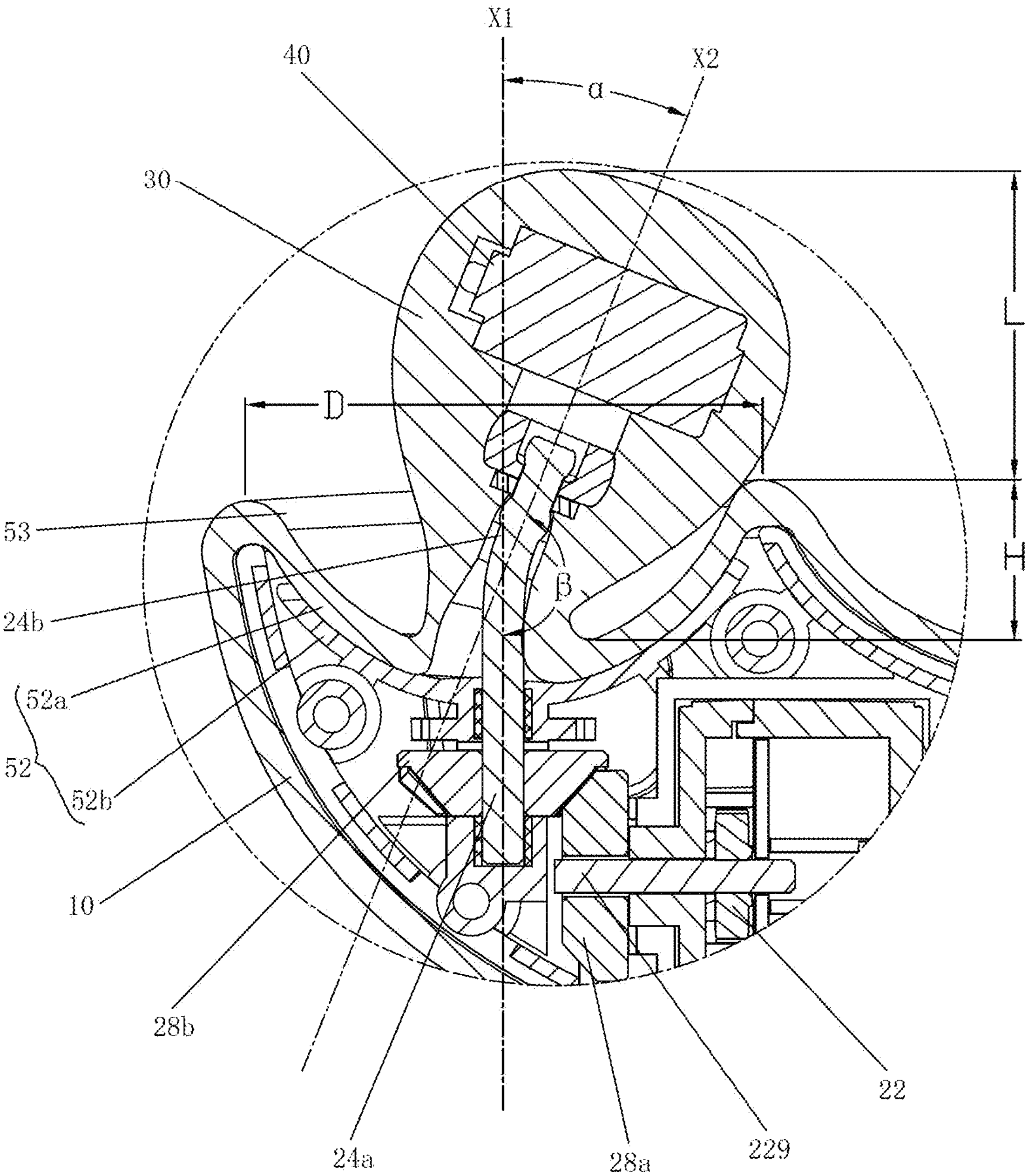
FIG. 3 is an enlarged view of circle III of FIG. 2.
Figure 4:
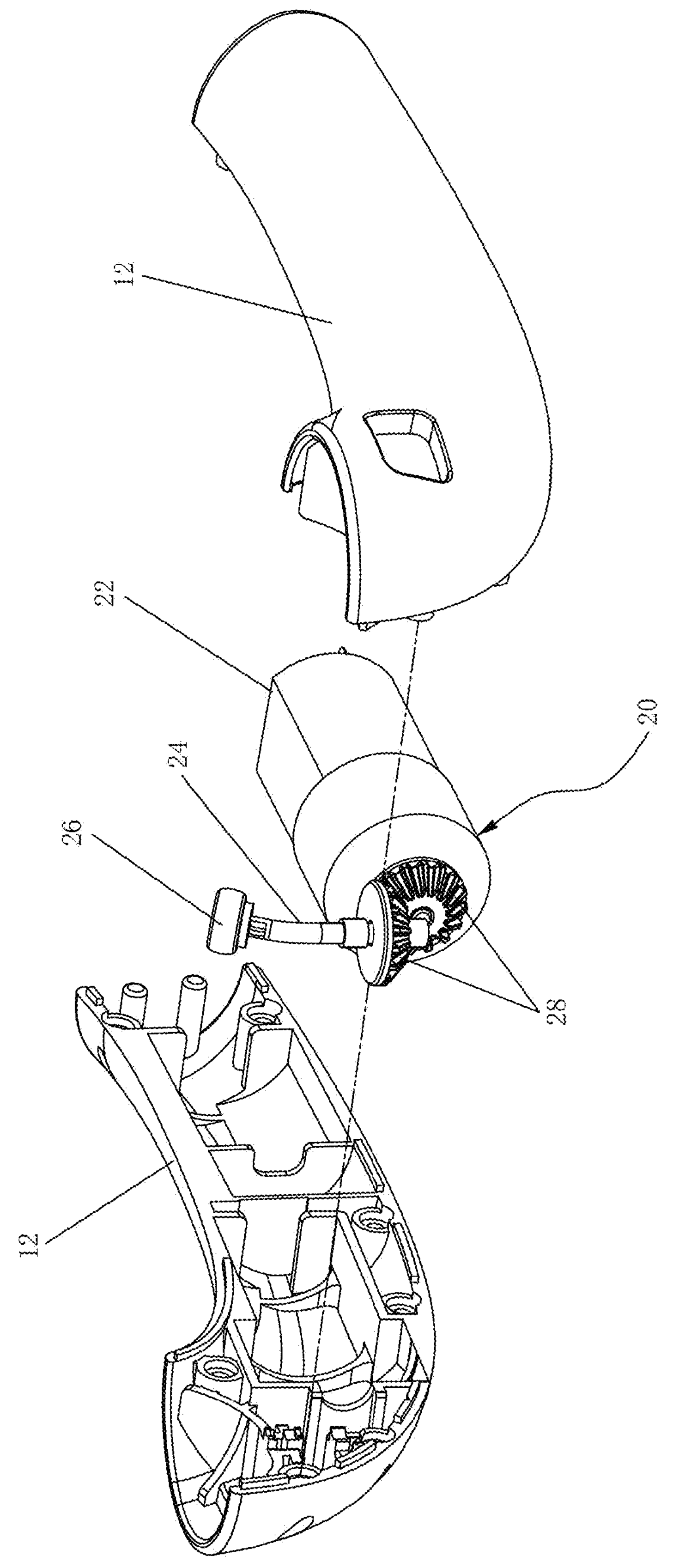
FIG. 4 a schematic, exploded view of the sexual stimulation device of FIG. 1, wherein an outer shell is removed.

As shown in FIG. 3, along the first axis X1, a depth of the bowl-shaped portion 52 is less than the height of the massage portion 30, so that the massage portion 30 extends partially beyond the bowl-shaped portion 52 through the open side 53, making it be convenient to contact the human body. The vibrating component 40 is fixed in a portion of the massage portion 30 extending beyond the bowl-shaped portion 52, so that the vibrating component 40 can be closer to the human body. The central axis X2 of the massage portion 30 is coaxial with or parallel to the central axis of the second end 24*b*, and the central axis of the bowl-shaped portion 52 is coaxial with or parallel to the central axis of the first end 24*a*, so that the massage portion 30 is eccentrically arranged relative to the bowl-shaped portion 52, facilitating swinging of the massage portion 30 inside the bowl-shaped portion 52. During swinging of the massage portion 20, a middle portion thereof is adjacent to the inner edge of the open side 53 of the bowl-shaped portion 52.

Under the driving of the gearbox 22, the driving rod 24 drives the massage portion 30 to rotate around the first axis X1 at an appropriate speed, such as not exceeding 1000 rpm. The first end 24*a* of the driving rod 24 rotates around its central axis, i.e., the first axis X1. The second end 24*b* and the massage portion 30 connected to the second end 24*b* rotate around the first axis X1/the first end 24*a*. The trajectory of massage portion 30 around the first axis X1 is generally circular, and the sensitive area of the human body covered by this circular trajectory can be kneaded by the massage portion 30, thereby enlarging the stimulation area and improving the stimulation effect.

Figure 7:
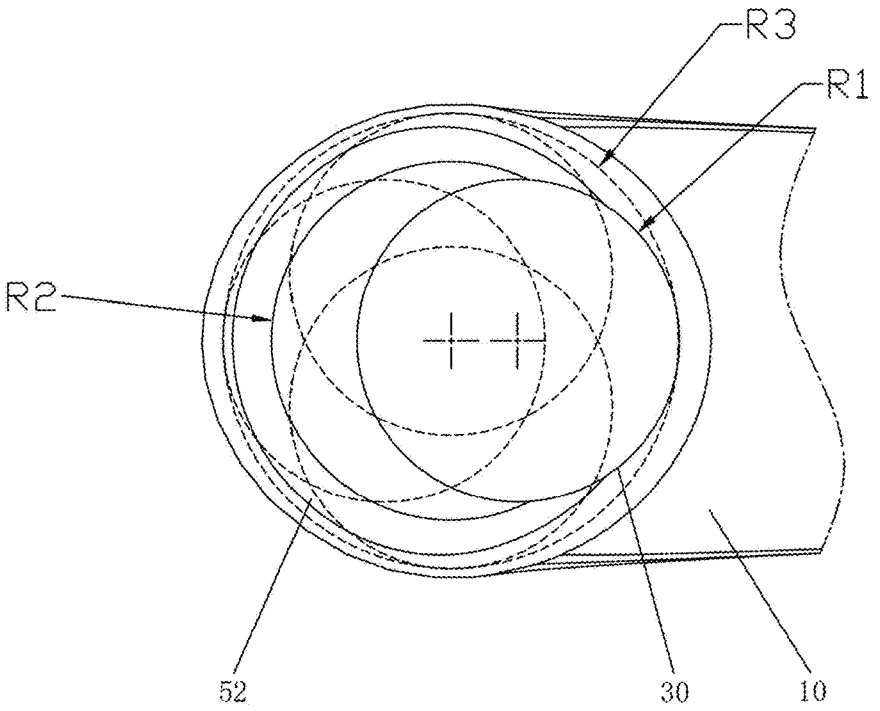
FIG. 7 is a schematic view of a trajectory of a massage portion of the sexual stimulation device of FIG. 1.

As shown in FIG. 7, on a plane perpendicular to the first axis X1, a projection of the massage portion 30 is generally a circle with a radius of R1, and a projection of the open side 53 of the bowl-shaped portion 52 is generally a circle with a radius of R2, wherein centers of the two projected circles are spaced from each other with a certain distance. During rotation of the massage portion 30 around the first axis X1, the bowl-shaped portion 52 may provide a support for the rotation of the massage portion 30 and limit the rotation trajectory of the massage portion 30. In this application, the massage portion 30 rotates around the first axis X1, and its trajectory is generally a circle with a radius of R3, wherein R3 is larger than R1, i.e., R3>R1.

For the existing devices, the human body are generally stimulated by high-frequency hitting. With the same massage portion 30, a stimulated area of the existing device is generally the circle with the radius of R1, while a stimulated area of the present device is generally the circle with the radius of R3. Therefore, without changing the size of the massage portion 30, an enlarged stimulation range on the human body can be obtained by changing the motion of the massage portion 30, thereby obtaining better stimulation effect. It should be understood that, based on the sexual organs to be stimulated, the massage portion 30 may have different sizes; and/or, the massage portion 30 may be deflected at different angles relative to the bowl-shaped portion 52, further improving the stimulation range of the massage portion 30 on the human body.

Figure 8:
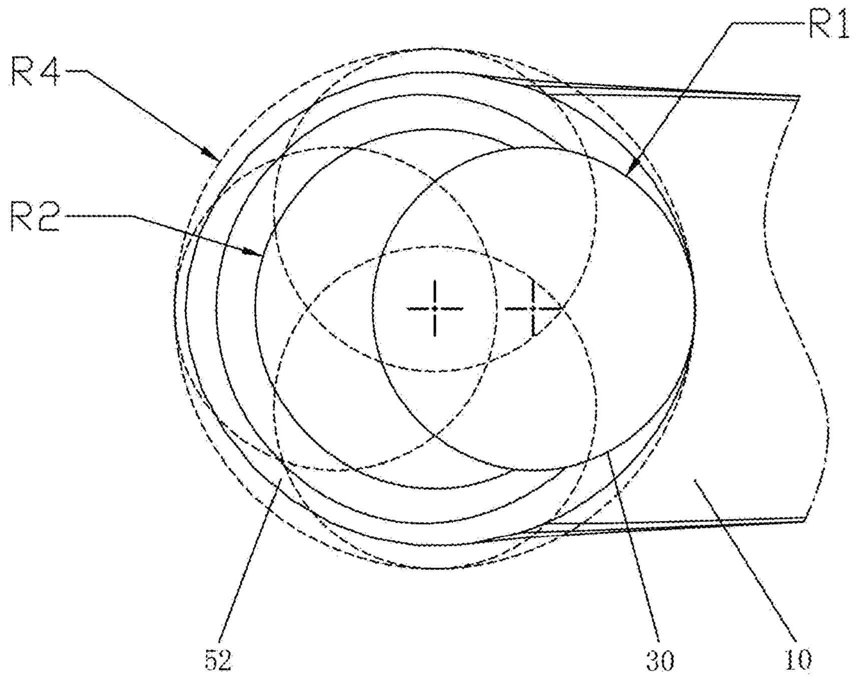
FIG. 8 is a schematic view of a trajectory of a massage portion of another sexual stimulation device.

In one embodiment, as shown in FIG. 8, the second angle α between the central axis X2 of the massage portion 30 and the first axis X1 is increased, and the sizes of the bowl-shaped portion 52 and the massage portion 30 are not changed. The distance between the center of the projection of the massage portion 30 on the plane perpendicular to the first axis X1 and the first axis X1 is increased. That is, the rotation radius of the massage portion 30 is increased to R4. In this way, the trajectory of the massage portion 30 is generally a circle with a radius of R4, wherein R4 is larger than R3, i.e., R4>R3. Due to the square relationship between area and radius, a little increase in the rotation radius of massage portion 30 may lead to a large increase in the stimulation range, further enhancing the stimulation effect.

In actual use, the stimulated part of the human body may experience slight indentations under the action of massage portion 30. Correspondingly, a part of the human body around the stimulated part may protrude due to the indentations of the stimulated part. The bowl-shaped portion 52 further provides support and surrounding for the surrounding part of the stimulated part. The massage portion 30 protrudes outwardly relative to bowl-shaped portion 52 allows it to maintain contact with the indented stimulated part, further enhancing the stimulation effect. In some embodiments, the depth H of the bowl-shaped portion 52 is 5-10 mm, which may be 6.5 mm, 7.8 mm, and etc. The diameter D of the open side 53 of the bowl-shaped portion 52 is 20-50 mm, which may be 32 mm, 45 mm, and etc. The height L of the massage portion 30 extending beyond the open side 53 of the bowl-shaped portion 52 is less than 50 mm, which may be 18.5 mm, 35 mm, and etc.

In this embodiment, a driving wheel 26 is mounted around the second end 24*b* of the driving rod 24. Generally, the driving wheel 26 is a flat and annular, and has a radial size larger than that of the driving rod 24, so that it can better drive the massage portion 30 to rotate. During production, the driving rod 24 and driving wheel 26 may be pre-assembled and placed in the mold, and then, the massage portion 30 is formed by over-molding. The driving wheel 26 may be fixed inside the massage portion 30 as on piece, effectively improving the connection stability therebetween. The massage portion 30, especially its end connected to the bowl-shaped portion 52, may have a clearance fit with the driving rod 24, allowing the massage portion 30 to produce sufficient deformation during rotation with the driving rod 24, making the rotation of the massage portion 30 smoother.

Preferably, the driving wheel 26 has a neck 27, and the driving wheel 26 has the smallest inner diameter at the neck 27. The second end 24*b* of the driving rod 24 extends through the neck 27 and forms two protrusions 25 at two opposite axial sides of the neck 27, respectively. The outer diameter of the protrusion 25 is larger than the inner diameter of the neck 27. After assembly, the protrusions 25 act as position limit components for the neck 27, so that the driving wheel 26 will not disengages from the driving rod 24 without external force, facilitating the forming and manufacturing of the outer shell and massage portion 30 in the subsequent process. Of course, the driving wheel 26 and the driving rod 24 may also be fixed by other means, such as tight fitting, which is not limited in this application.

In this embodiment, the massage portion 30 is provided at the front end of the shell 10, and the driving mechanism 20 is set adjacent to the front end of the shell 10 to facilitate the connection between the driving mechanism 20 and the massage portion 30. For the convenience of arrangement of the gearbox 22, the driving mechanism 20 further includes a steering unit 28 set between the gearbox 22 and the driving rod 24. In the illustrated embodiment, the steering unit 28 is a steering gear unit, and includes a first gear 28*a* and a second gear 28*b* that mesh with each other. The first gear 28*a* is mounted around the output shaft 229 of the gearbox 22, and the second gear 28*b* is mounted around the first end 24*a* of the driving rod 24, thereby achieving power transmission between the gearbox 22 and the driving rod 24.

In this embodiment, the first gear 28*a* and the second gear 28*b* both are bevel gears, which can change the power transmission direction while achieving power transmission, so that the extension direction of the output shaft 229 of the gearbox 22 can be different from the extension direction of the first end 24*a* and the second end 24*b* of the driving rod 24. Specifically, the output shaft 229 may be perpendicular to the first end 24*a* and inclined relative to the second end 24*b*. In other embodiments, according to the space in the shell 10, the gearbox 22 may be arranged in other positions, including the rear end of the shell 10.

In some embodiments, the gearbox 22 may be connected to the driving rod 24 directly, omitting the steering unit 28. At this time, the output shaft 229 of the gearbox 22 may extend outwardly from a lateral side of the gear housing 225, being inclined or perpendicular relative to the output shaft 222 of the motor 221. In this situation, the gears 227 inside the gear housing 225 may include bevel gears, etc., and the gearbox 22 itself may achieve power transmission and change of the power transmission direction.

In this embodiment, the inner shell of the shell 10 forms a support frame 12 at a position corresponding to the driving mechanism 20. The support frame 12 is used to support the gearbox 22, the driving rod 24, etc. In the illustrated embodiment, the support frame 12 is consisted of two parts which are connected by snapping-fitting, an internal space is formed between the two parts of the support frame 12 for accommodating the driving mechanism 20 therein. The first end 24*a* of the driving rod 24 may be rotatably inserted into a shaft seat 14 formed in the support frame 12. Preferably, a bearing 16 is provided in the shaft seat 14. The second end 24*b* of the driving rod 24 extends beyond the support frame 12 and is inserted into the massage portion 30. During production, the support frame 12 is firstly assembled with the driving mechanism 20, and then the outer shell and massage portion 30 are formed by over-molding, so as to fix the driving mechanism 20 and support frame 12 in the outer shell integrally.

In this embodiment, the rear end of the shell 10 serves as a handle of the sexual stimulation device 100, and a plurality of buttons 54 are provided on the handle, such as switch keys, function keys, etc., In the handle of shell 10, a control device, such as a control circuit board 56 is provided. The button 54 forms a control circuit with the gearbox 22, the vibration motor 40, and etc. through the control circuit board 56. The user can control the operation of the sexual stimulation device 100, such as adjust the speed and rotation direction of the gearbox 22, adjust the vibration frequency of vibration motor 40, etc. through the buttons 54. A battery 58, such as a rechargeable battery, is provided in the handle of the shell 10 and electrically connected to control circuit board 56, severing as the power source of the whole sexual stimulation device 100.

During the use of the sexual stimulation device 100, the users may choose different modes through the buttons 54 on the handle according to needs. For example, the users may only start the vibration motor 40 to drive the massage portion 30 to perform high-frequency vibration, achieving a certain stimulation effect through vibration. Alternatively, the users may only start the gearbox 22 to drive the massage portion 30 to rotate, producing a kneading stimulation effect on the human body. Alternatively, the users may simultaneously start the vibration motor 40 and the gearbox 22, making the massage portion 30 to vibrate and rotating, generating a dual stimulation effect on the human body, which is convenient to use and has a good stimulation effect.

Figure 9:
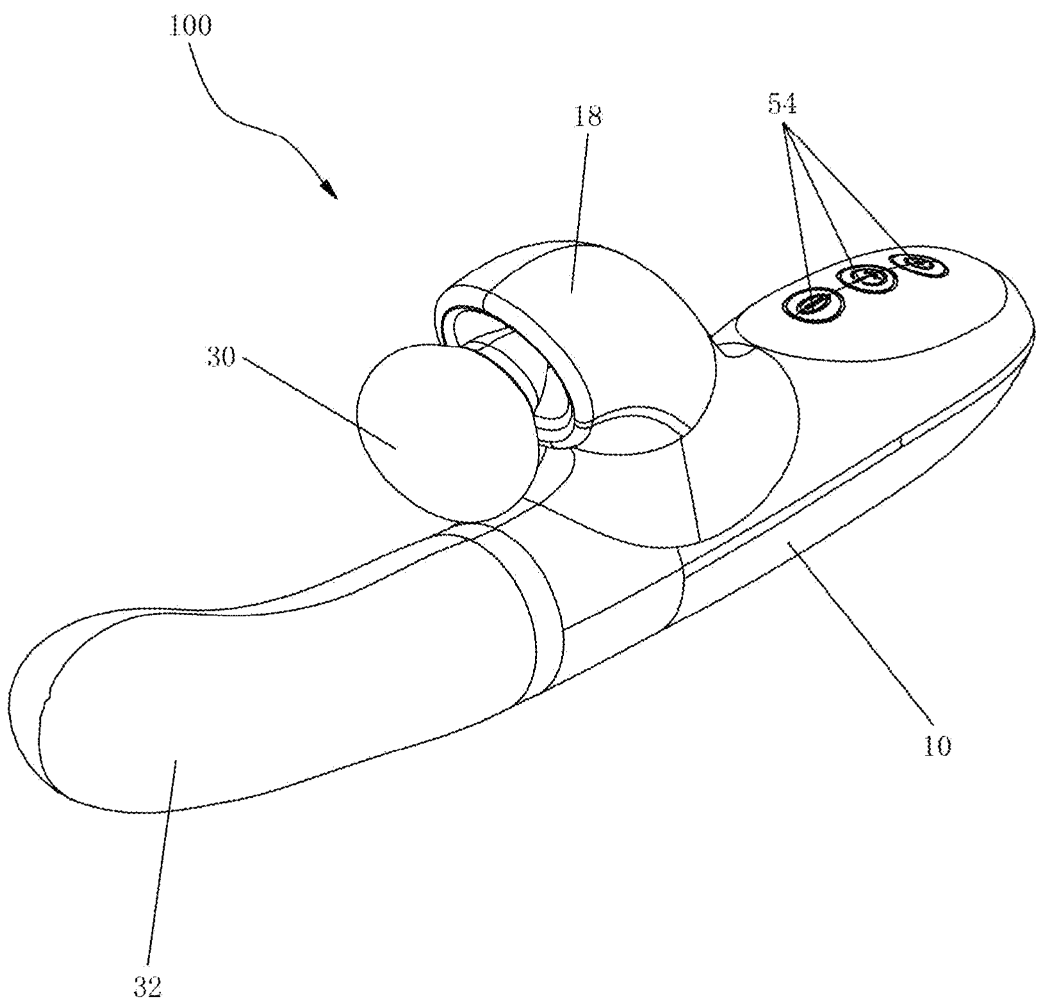
FIG. 9 is a schematic, assembled view of a sexual stimulation device according to a second embodiment of the present application.
Figure 10:
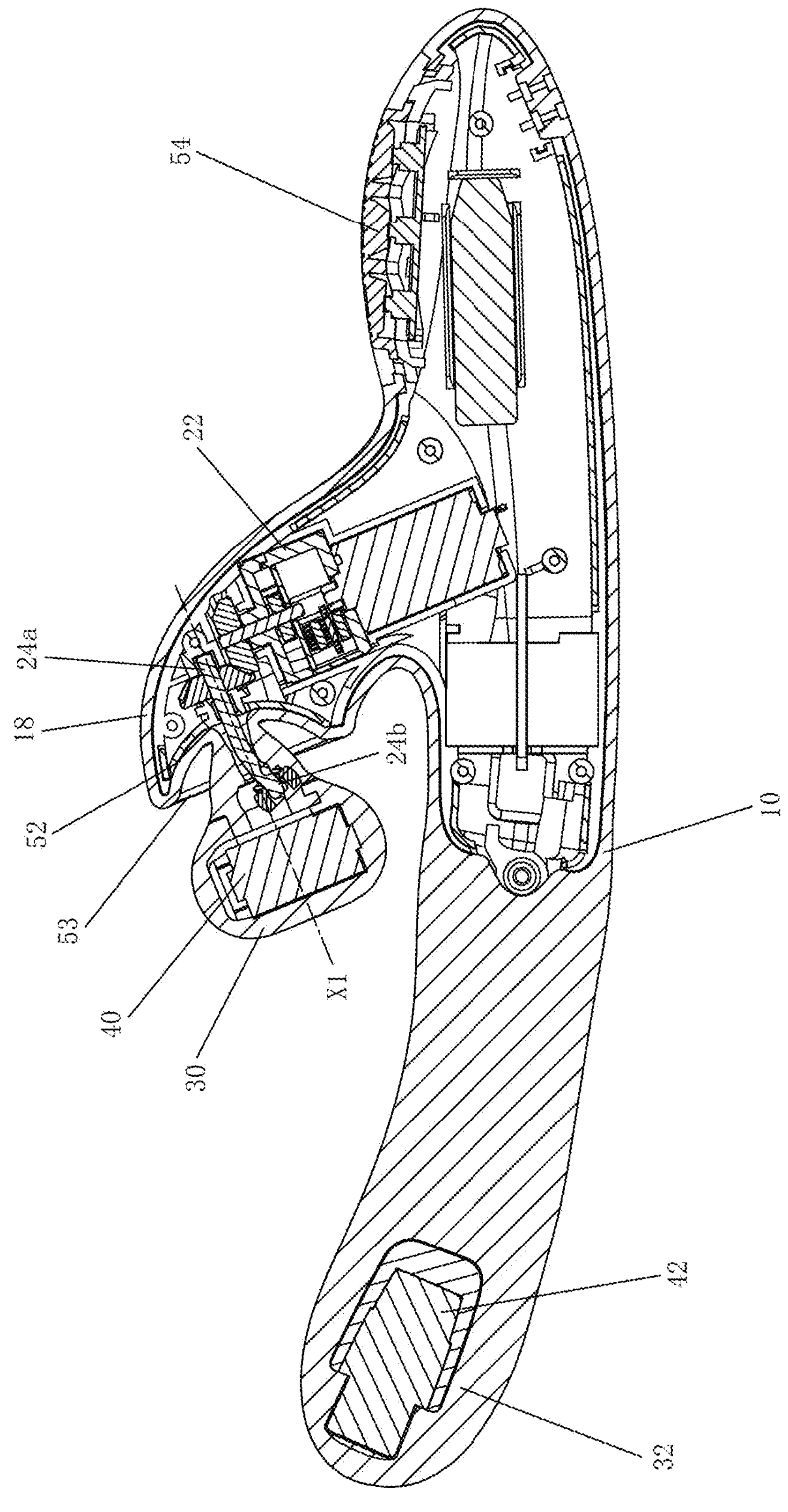
FIG. 10 is a cross sectional view of the sexual stimulation device of FIG. 9.

FIGS. 9-10 show another embodiment of the sexual stimulation device of the present application, which differs from the previous embodiment mainly in the massage portion. In this embodiment, the shell 10 of the sexual stimulation device 100 is generally elongated and rod-shaped. A branch 18 extends from the rear end of the shell 10 curvedly towards an upper side of a middle portion of the shell 10, and a distal end of the branch 18 is concaved inwardly to form the bowl-shaped portion 52. The massage portion 30 is set in the bowl-shaped portion 52 and partly extends beyond the bowl-shaped portion 52 through its open side 53. In this embodiment, the open side 53 of the bowl-shaped portion 52 is inclined at a certain angle towards the middle portion of the shell 10, and the massage portion 30 extends beyond the bowl-shaped portion 52 is close to the middle portion of the shell 10.

The shell 10 is provided with a driving mechanism 20, which includes a gearbox 22 and a driving rod 24. The driving rod 24 includes a first end 24*a* and a second end 24*b* opposite to the first end 24*a*. The first end 24*a* is connected to the gearbox 22, and the second end 24*b* is inserted into the massage portion 30. Under the action of the gearbox 22, the massage portion 30 rotates along with the second end 24*b* around the first end 24*a*, forming an annular trajectory, which can generate a kneading effect on the human body. Similarly, the massage portion 30 is provided with a vibration component 40, such as a vibration motor, which allows the massage portion 30 to generate dual stimulation on the human body.

In this embodiment, the front end of the shell 10 forms a massage end 32, and another vibration component 42, such as a vibration motor, is provided inside the massage end 32. The rear end of shell 10 serves as a handle for holding of the sexual stimulation device 100. The handle is equipped with buttons 54, etc., to control the operation of gearbox 22, the vibration components 40, 42, and etc. During use of the sexual stimulation device 100, the massage portion 30 and the massage end 32 act on two different parts of the human body, further improving the stimulation effect. For example, the massage end 32 may be used to stimulate the vagina while the massage portion 30 may be used to stimulate the clitoris. For another example, the massage end 32 may be used to stimulate the rectum while the massage portion 30 may be used to stimulate the prostate.

Figure 11:
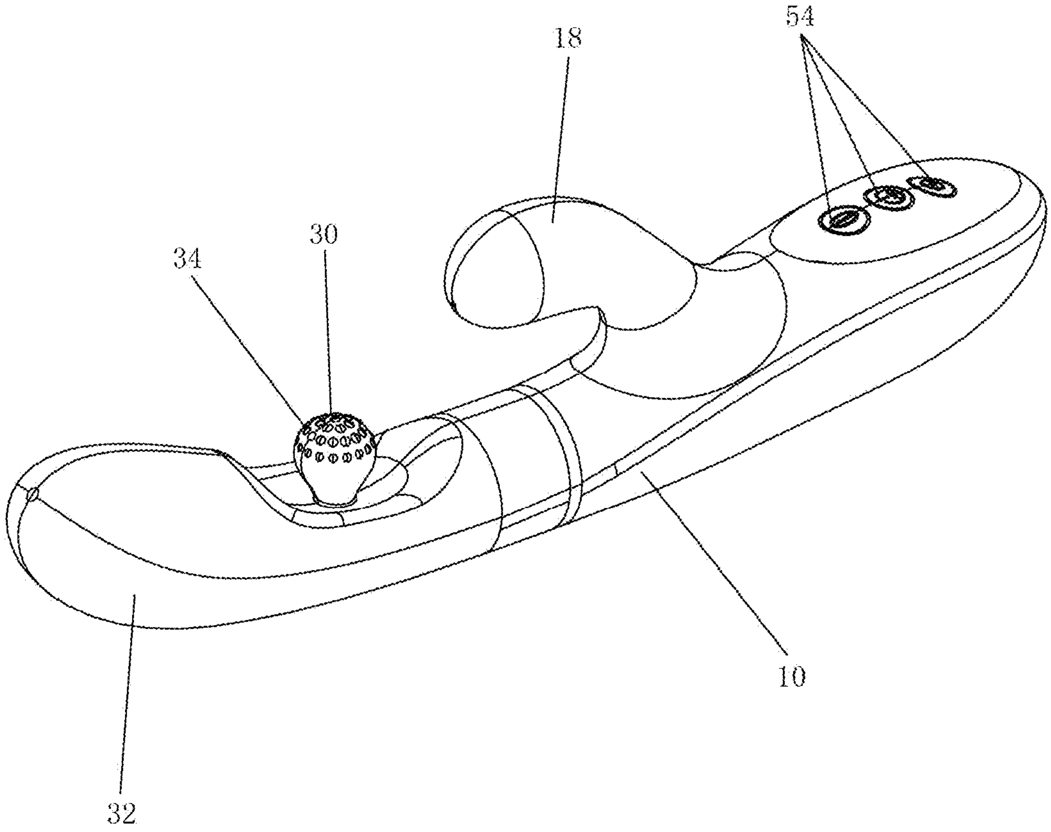
FIG. 11 is a schematic, assembled view of a sexual stimulation device according to a third embodiment of the present application.
Figure 12:
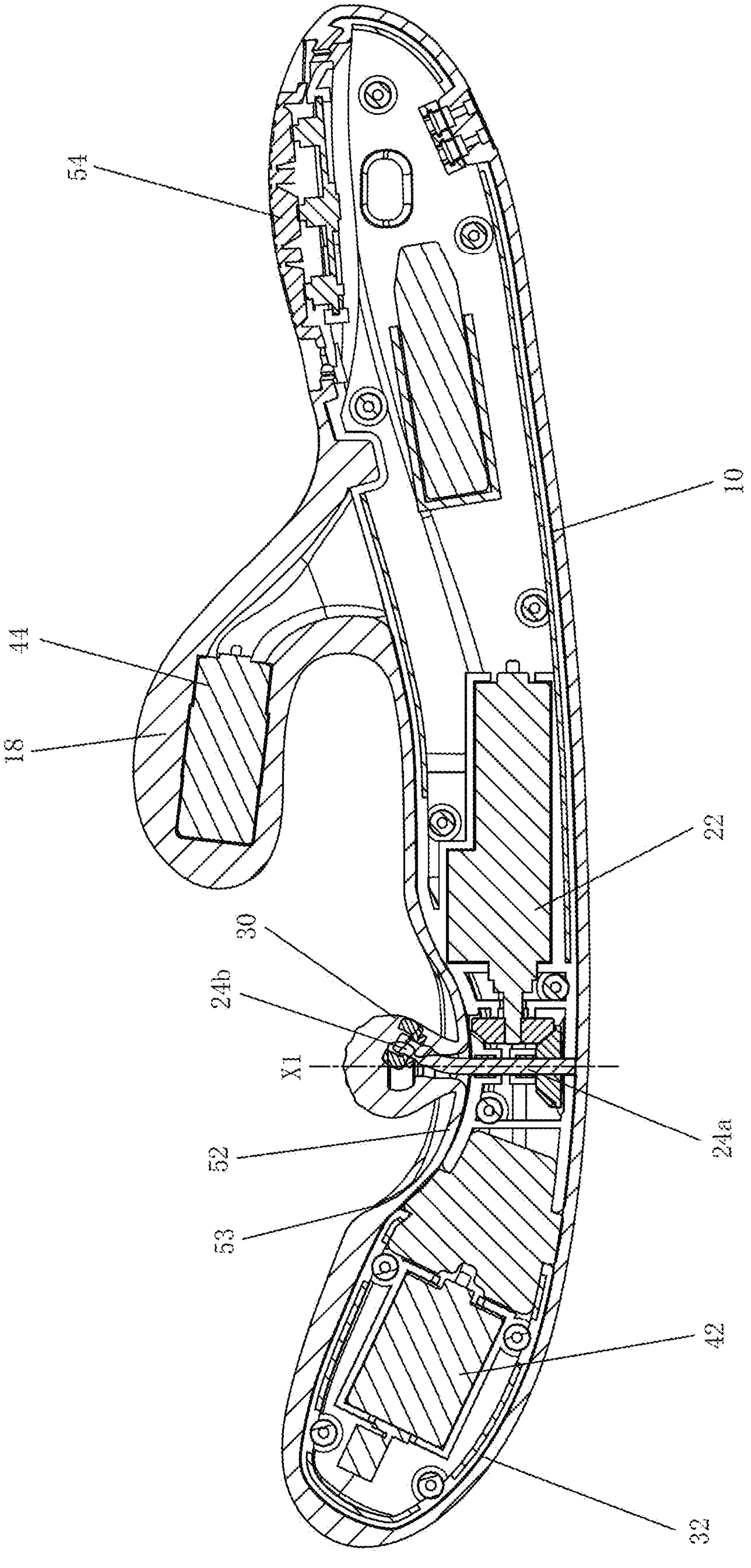
FIG. 12 is a cross sectional view of the sexual stimulation device of FIG. 11.

FIGS. 11-12 show another embodiment of the sexual stimulation device of the present application, which differs from the previous embodiment mainly in the massage portion. In this embodiment, the shell 10 of the sexual stimulation device 100 is generally elongated and rod-shape. A middle portion of the shell is concaved inwardly and laterally to form the bowl-shaped portion 52. The massage portion 30 is set in the bowl-shaped portion 52 and partly extends beyond the bowl-shaped portion 52 through its open side 53. Preferably, protrusions 34 are provided on an outer surface of the massage portion 30 to enhance the stimulation effect of the massage portion 30.

The shell 10 is provided with a driving mechanism 20, which includes a gearbox 22 and a driving rod 24. The driving rod 24 includes a first end 24*a* and a second end 24*b* opposite to the first end 24*a*. The first end 24*a* is connected to the gearbox 22, and the second end 24*b* is connected to the massage portion 30. Under the action of gearbox 22, the massage portion 30 rotates along with the second end 24*b* around the first end 24*a*, forming an annular trajectory, which can generate a kneading effect on the human body.

In this embodiment, the front end of the shell 10 forms a massage end 32, and a vibration component 42, such as a vibration motor, is provided inside the massage end 32. A branch 18 extends from the rear end of the shell 10 curvedly towards an upper side of a middle portion of the shell 10, and another vibration component 44, such as another vibration motor, is provided inside the branch 18. The rear end of shell 10 serves as a handle for holding of the sexual stimulation device 100. The handle is equipped with buttons 54 to control the operation of the gearbox 22, the vibration components 42, 44, and etc. When this sexual stimulation device is in use, the massage portion 30, the massage end 32, and the branch 18 may respectively act on three different parts of the human body, for example, the massage end 32 may be used to stimulate the vagina, the massage portion 30 may be used to stimulate the crus of clitoris, and branch 18 may be used to stimulate the glans of clitoris, further improving the stimulation effect.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A hand-held sexual stimulation device, comprising:

a shell comprising a massage portion which is made of a flexible material; and a driving mechanism being provided in the shell, the driving mechanism comprising a gearbox and a driving rod, the driving rod comprising a first end and a second end opposite to the first end, the first end being connected to the gearbox in a transmission way, and the second end being inserted into the massage portion of the shell;

wherein the shell further comprises an inner layer and an outer layer that covers the inner layer, the outer layer is integrally formed with the flexible material of the massage portion, the inner layer has a hardness greater than a hardness of the outer layer, the outer layer comprising a bowl-shaped concaved portion recessed inwardly from an external surface of the shell, a chamber being defined in the bowl-shaped concaved portion and communicating with an outside environment out of the shell;

the massage portion comprising a first end received in the chamber of the bowl-shaped concaved portion and a second end extending beyond an opening of the chamber to the outside environment;

an output shaft of the gearbox being perpendicular to the first end of the driving rod, the second end of the driving rod being inclined relative to the first end of the driving rod, and the massage portion being rotatable along with the second end of the driving rod around the first end of the driving rod under the driving of the gearbox, the second end of the driving rod is configured to rotate the massage portion in an annular trajectory, wherein a bottom portion of the massage portion that comprises the first end portion of the massage portion is configured to rotate within the chamber and the bowl-shaped concaved portion, and wherein an upper portion of the massage portion that comprises the second end of the massage portion is configured to rotate in the outside environment that is outside of the chamber and the bowl-shaped concaved portion.

2. The hand-held sexual stimulation device according to claim 1, wherein a vibrating member is provided inside the upper portion of the massage portion that extends beyond the chamber of the shell, and rotates along with the second end of the driving rod around the first end of the driving rod.

3. The hand-held sexual stimulation device according to claim 1, wherein the massage portion and the second end of the driving rod rotate around the first end of the driving rod with a speed not exceeding 1000 rpm.

4. The hand-held sexual stimulation device according to claim 3, wherein the gearbox comprises a motor and a gear unit connected between the motor and the first end of the driving rod, the gear unit comprises a plurality of gears that mesh with each other, and a reduction ratio of the gear unit is 4:1 to 100:1.

5. The hand-held sexual stimulation device according to claim 4, wherein the driving mechanism further comprises a steering unit connected between the gear unit of the gearbox and the first end of the driving rod.

6. The hand-held sexual stimulation device according to claim 4, wherein the first end of the driving rod is perpendicular to an output shaft of the motor of the gearbox.

7. The hand-held sexual stimulation device according to claim 1, wherein the massage portion is substantially spherical-shaped or ellipsoidal-shaped, the first end of the massage portion is connected to a central, bottom of the bowl-shaped concaved portion, and a central axis of the concaved portion is inclined relative to a central axis of the massage portion.

8. The hand-held sexual stimulation device according to claim 7, wherein the central axis of the massage portion is substantially coaxial with a central axis of the second end of the driving rod, and the central axis of the bowl-shaped concaved portion is substantially coaxial with a central axis of the first end of the driving rod.

9. The hand-held sexual stimulation device according to claim 1, wherein the first end of the massage portion an outer diameter that is smaller than an outer diameter of the second end, the first end of the massage portion is connected to a central bottom of the bowl-shaped concaved portion of the shell.

10. The hand-held sexual stimulation device according to claim 1, wherein the shell is elongated, and comprises a front end, a rear end and a middle portion between the front end and the rear end, and the rear end of the shell serves as a handle for holding of the sexual stimulation device; and wherein the massage portion is provided at the front end of the shell, and a vibration motor is provided inside the massage portion.

11. The hand-held sexual stimulation device according to claim 1, wherein the shell is elongated, and comprises a front end, a rear end and a middle portion between the front end and the rear end, and the rear end of the shell serves as a handle for holding of the sexual stimulation device; and wherein the massage portion is provided at the middle portion of the shell, and a vibration motor is provided inside the front end of the shell.

12. The hand-held sexual stimulation device according to claim 1, wherein the shell is elongated, and comprises a front end, a rear end and a middle portion between the front end and the rear end, and the rear end of the shell serves as a handle for holding of the sexual stimulation device; and wherein a branch extends curvedly from the rear end of the shell to an upper side of the middle portion of the shell, the massage portion is provided at a distal end of the branch, a vibration motor is provided inside the massage portion, and another vibration motor is provided inside the front end of the shell.

* * * * *